United States Patent
Bantz et al.

(10) Patent No.: US 7,386,708 B2
(45) Date of Patent: Jun. 10, 2008

(54) SECURE HARDWARE PERSONALIZATION SERVICE

(75) Inventors: David Fredrick Bantz, Portland, ME (US); Thomas E. Chefalas, Somers, NY (US); Steven J. Mastrianni, Unionville, CT (US); Clifford A. Pickover, Yorktown Heights, NY (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 205 days.

(21) Appl. No.: 11/035,337

(22) Filed: Jan. 13, 2005

(65) Prior Publication Data

US 2006/0156406 A1 Jul. 13, 2006

(51) Int. Cl.
*G06F 15/76* (2006.01)
(52) U.S. Cl. ...................................... 712/226
(58) Field of Classification Search ............... 712/226, 712/13, 15; 726/27, 28, 29, 23, 34, 4
See application file for complete search history.

(56) References Cited

U.S. PATENT DOCUMENTS

| | | | | |
|---|---|---|---|---|
| 5,440,740 A | * | 8/1995 | Chen et al. | 718/104 |
| 6,081,894 A | * | 6/2000 | Mann | 713/188 |
| 6,154,830 A | * | 11/2000 | Sugimura | 712/205 |
| 6,326,806 B1 | * | 12/2001 | Fallside et al. | 326/38 |
| 6,356,637 B1 | * | 3/2002 | Garnett | 380/265 |
| 6,421,817 B1 | * | 7/2002 | Mohan et al. | 716/16 |
| 6,631,487 B1 | * | 10/2003 | Abramovici et al. | 714/725 |
| 6,704,816 B1 | * | 3/2004 | Burke | 710/100 |
| 6,754,881 B2 | * | 6/2004 | Kuhlmann et al. | 716/16 |
| 6,886,092 B1 | * | 4/2005 | Douglass et al. | 712/37 |
| 6,904,527 B1 | * | 6/2005 | Parlour et al. | 713/189 |
| 6,981,109 B2 | * | 12/2005 | Goko et al. | 711/152 |
| 6,996,713 B1 | * | 2/2006 | Trimberger | 713/161 |
| 2001/0047514 A1 | * | 11/2001 | Goto et al. | 717/11 |
| 2003/0110306 A1 | * | 6/2003 | Bailis et al. | 709/253 |
| 2004/0268288 A1 | * | 12/2004 | Bajuk et al. | 716/16 |

* cited by examiner

*Primary Examiner*—Eric Coleman
(74) *Attorney, Agent, or Firm*—Duke W. Yee; Charlie Bustamante; Theodore D. Fay, III

(57) ABSTRACT

Methods and devices for securely providing personalities to reconfigurable hardware. Reconfigurable hardware is provided with one or more domains. At least one domain serves as a gatekeeper domain and another domain serves as a task domain. A service provider provides an authentication and security personality to the gatekeeper domain. The hardware is shipped to the user. A user then accesses the service provider via a network connection and downloads a task personality into the task domain, but only if the personality in the gatekeeper domain allows the download to take place. Once the task personality completes a task, the user may download another task personality into the task domain, if permitted by the personality loaded in the gatekeeper domain. The domains and personalities are managed and made available by the service provider.

28 Claims, 3 Drawing Sheets

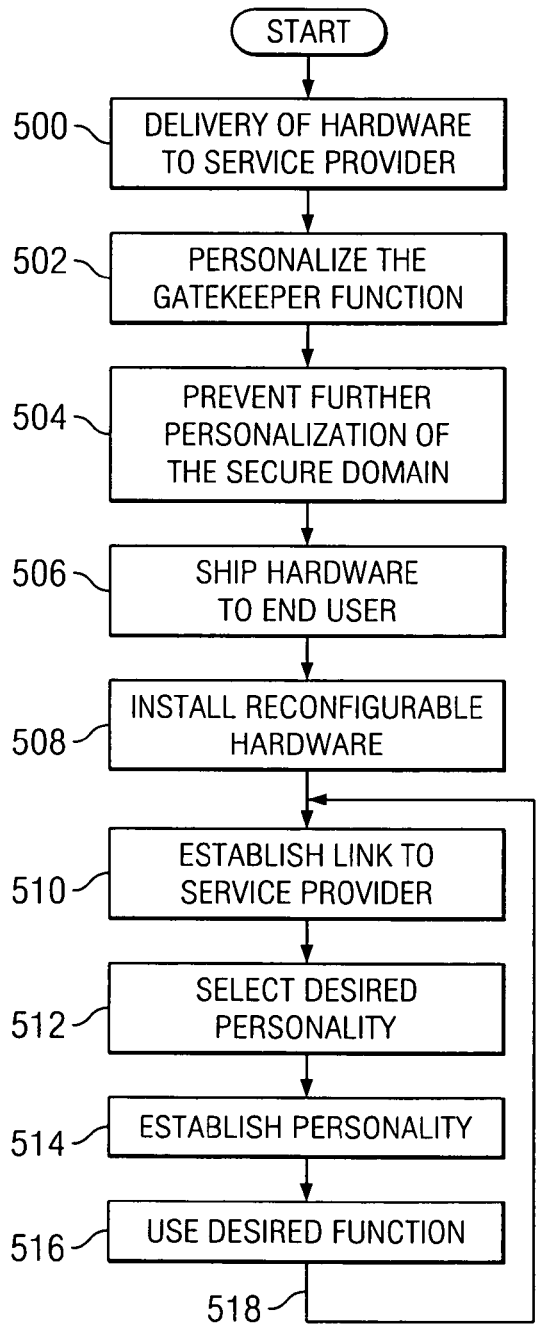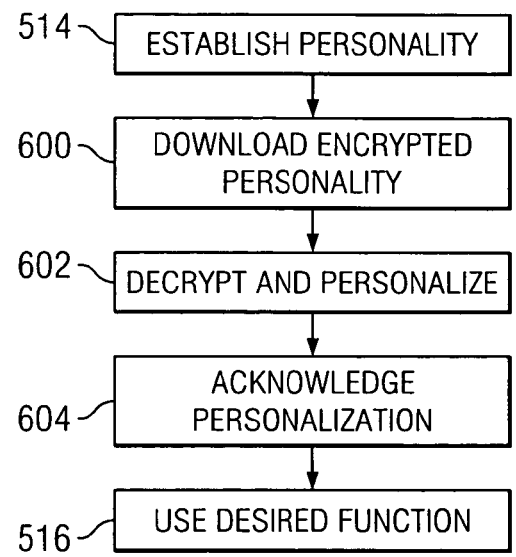

SECURE HARDWARE PERSONALIZATION SERVICE

BACKGROUND OF THE INVENTION

1. Technical Field

The present invention relates to computers, computer hardware, and computer software. More particularly, the present invention relates to a system and method for providing a secure hardware personalization service.

2. Description of Related Art

As personal computing becomes more data-intensive in a security conscious environment, traditional means of assuring data integrity and security are proving inadequate. Antivirus scans may take all night, disk integrity checks may take most of a day and the encryption of large blocks of data can take more than a day. Indexing and search of large volumes of data is already computationally burdensome and is likely to get more so as search extends to visual and audible media. This trend is exacerbated by increasing disk sizes, driven in turn by diverse media. At the same time, viruses, trojans, and denial-of-service attacks are increasing in frequency and sophistication. High-volume Web servers are already turning to specialized hardware (e.g., SSL accelerators) to handle this problem, but the personal computing environment is too price-sensitive and too diverse in usage models to find single-purpose solutions acceptable.

One method of addressing the problem is through the use of reconfigurable hardware. Reconfigurable hardware is hardware capable of being provided with different personalities at different times. A personality defines the function of the reconfigurable hardware, which may include anti-virus scanning, indexing, encryption, decryption, and search orders. Because reconfigurable hardware is provided as a separate component in a system and is dedicated to a particular task, reconfigurable hardware is often capable of performing these functions orders of magnitude faster than if the computer had to use its own resources to perform these functions. Reconfigurable hardware can also perform some functions transparently. Thus, reconfigurable hardware associated with a hard disk controller can leverage the always-reading property of hard disks to process their contents without any overhead to file access. (Reconfigurable hardware will be primarily associated with I/O paths and specific data-intensive devices.) When the reconfigurable hardware has completed a task, a new personality can be provided to the hardware to perform a new task.

Reconfigurable hardware in a computer or server allows the dynamic instantiation of function through loading of personality into the hardware. That function, being hardware-based, can be orders of magnitude faster than the same function implemented as a program.

Reconfigurable hardware typically consists of integrated circuits, each of which contains many thousands of logic elements, with a general interconnection scheme. A specific personality or logical functionality can be stored in interconnection switches with memory. These memory switches determine which logic element inputs are connected to which logic element outputs. Many complex logical functions can be realized by setting the memory of the various interconnection switches. These functions include, but are not limited to arithmetic functions, storage functions, and sequencing functions. Such integrated circuits are known as field-programmable gate arrays, or FPGAs. Examples of these FPGAs are manufactured by the Xilinx Corporation of San Jose, Calif., who, in 2003, announced their plans to make available such circuits with over a billion transistors on a single chip. Another example may be seen in a plug-in card designed by Derivation Systems, of Carlsbad Calif. The plug-in card contains FPGAs in an industry-standard form factor. Such cards are an example of how FPGAs can be packaged for inclusion in a personal computer or server. Derivation Systems has computed personality for this card that allows it to function as a high-speed encryption processor, and a second personality that executes Java™ bytecodes directly in hardware and at high speed. These are examples of high-level system functions that can be valuable to a PC or server, and can be created dynamically by loading a personality into one or more FPGAs. The use of FPGAs in this manner is referred to as "reconfigurable hardware."

The programming of an FPGA requires a specification of the desired logic function of the personalized chip together with knowledge of the specific capacity, performance and organization of the chip. Given this knowledge, a design program can compute the values of each bit to be stored in each of the memory switches of the chip. This design program is extremely complex, often specific to the products of a single chip manufacturer, and may require significant processing, memory, and storage resources to run. Likewise, the determination of the desired logic function of the personalized chip may also be complex and time-consuming, and may require the services of a skilled human designer. These considerations have limited FPGA use to specific products whose price or volume justifies the expenditure necessary to determine the specific personality of the chip. Accordingly, the sequence of bits that represents the personality becomes a significant asset of the company whose product contains the chip.

The most efficient way to change the personality of reconfigurable hardware is via a network connection (such as over the Internet). A service provider merely has to provide the reconfigurable hardware with a new personality. However, because the personality represents a significant investment to the service provider, methods and devices are needed to provide a very high level of security to prevent piracy. The problem is analogous to, but distinct from, the problem of digital rights management of entertainment content.

SUMMARY OF THE INVENTION

The inventions described below provide for devices and methods of securing the personality of reconfigurable hardware installed on a computer. Reconfigurable hardware is structured into two or more access domains, with each domain distinguished by the means by which each domain is personalized. A first domain serves as a gatekeeper. The gatekeeper domain authenticates the client, the service provider, and the hardware. A second domain serves as the task domain. A task personality, which performs a specific function such as virus scanning, is downloaded into the task domain via a network connection, such as the Internet, if the gatekeeper domain allows the transaction to take place. Similarly, the personality may be downloaded into the task domain, but the functions of the task personality may be inaccessible to the client unless the gatekeeper domain decrypts the data or otherwise allows access. The service provider manages both the gatekeeper domain and the task domain and charges a fee for downloading the task personality.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart showing a sequence of steps for the hardware personalization service provider and the end user to take to personalize the reconfigurable hardware, in accordance with a preferred embodiment of the present invention.

FIG. 6 is a flow chart showing a process performed by the service provider to establish the personality of the reconfigurable hardware securely in step 514 of FIG. 5, in accordance with a preferred embodiment of the present invention.

DETAILED DESCRIPTION OF THE PREFERRED EMBODIMENT

Figure 1:
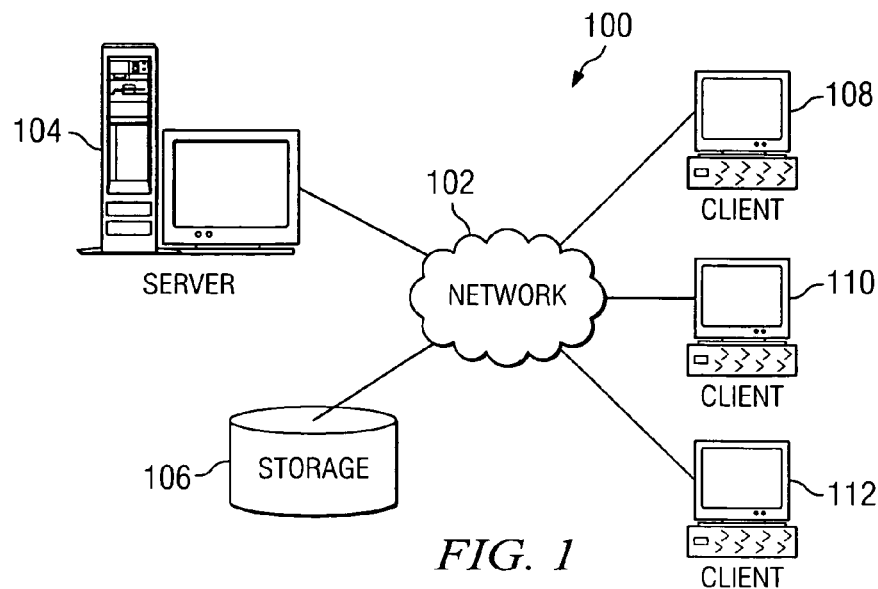
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
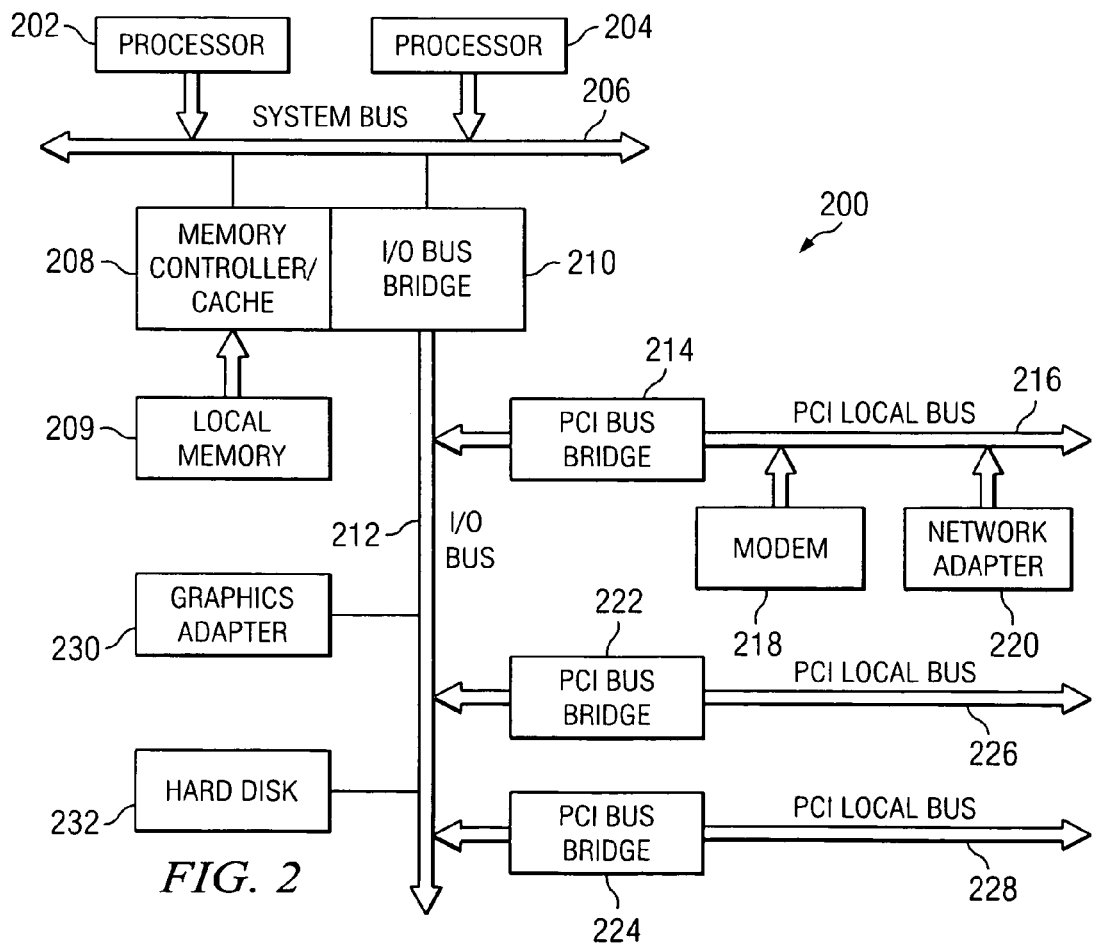
FIG. 2 is a block diagram of a data processing system that may be implemented as a server, such as server 104 in FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
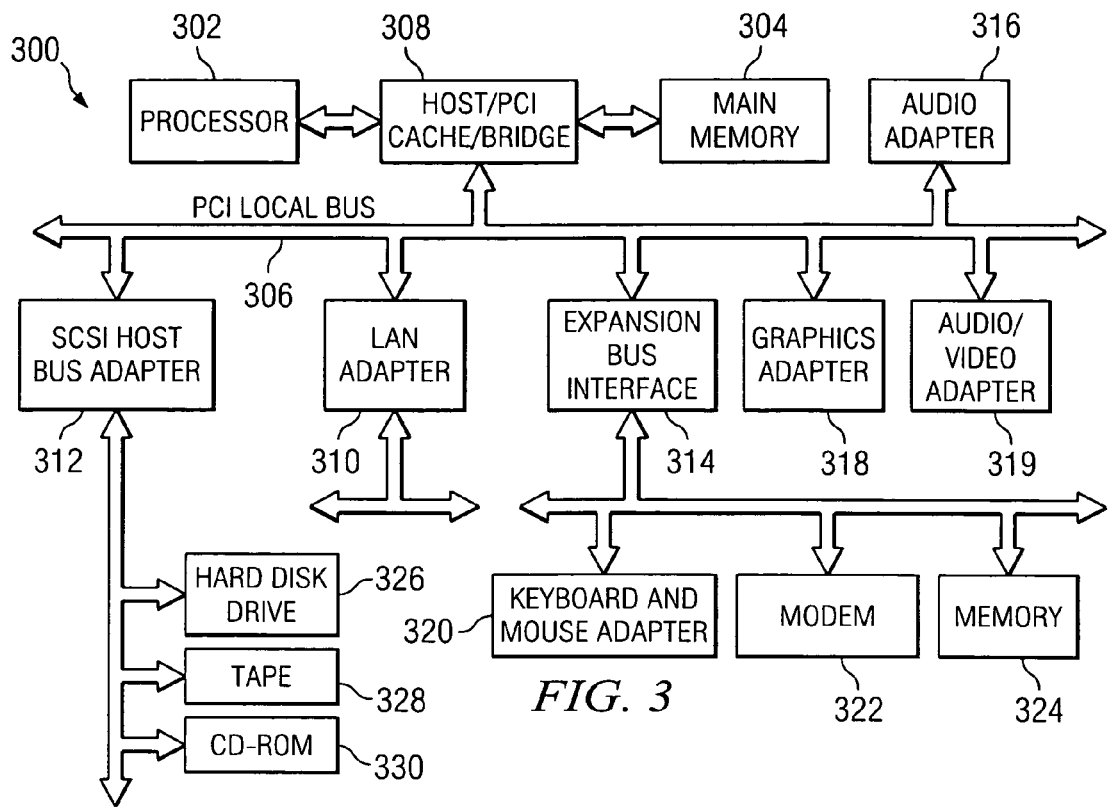
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
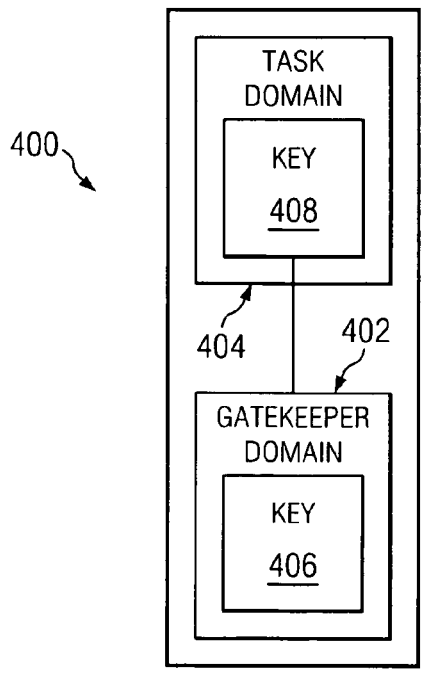
FIG. 4 shows reconfigurable hardware partitioned into two domains, a gatekeeper domain and a task domain, in accordance with a preferred embodiment of the present invention.

FIG. 4 shows reconfigurable hardware 400 partitioned into two domains, a gatekeeper domain 402 and a task domain 404, for the purposes of providing security to the personality in the task domain. The gatekeeper domain prevents the task domain from receiving a personality or prevents an unauthorized user from using or changing the personality in the task domain. Preferably, one or more keys are provided with both the gatekeeper domain and the task domain to provide further security to the personality contained in both domains. The key to the gatekeeper domain and the gatekeeper personality itself prevent the gatekeeper personality from being altered in an unauthorized manner. The key to the task domain allows the gatekeeper domain to have greater control over the task domain. A service provider controls the gatekeeper personality and the task personality. Thus, the service provider is able to reliably charge a fee for download or use of a task personality or for changing a task personality.

Turning again to FIG. 4, the reconfigurable hardware may be connected to the system of FIG. 3 via a plug-in bus provided with the computer. (Many solutions exist for hardware extension, including external plug-in facilities such as the Universal Serial Bus and others. The reconfigurable hardware may also be an integral part of the computer systems of FIGS. 1, 2, and 3. By whatever manner the reconfigurable hardware is connected to the system, the reconfigurable hardware is provided with multiple domains to provide security for the hardware personality.) The reconfigurable hardware may be provided in the form of a hard disk controller, memory controller, I/O controller, video controller, audio controller or any other reconfigurable hardware suitable for use in a computer system.

Domain 402 serves the role of gatekeeper and may be referred to as the gatekeeper domain. The service provider uses a first key 406 to control whether the gatekeeper domain 402 can, itself, be personalized. Domain 404 contains the reconfigurable hardware that will be personalized to perform a specific function for the computer, and may be referred to as the task domain. The personality in the task domain may be programmed to perform a variety of functions, including antivirus scanning and cleaning, adware removal, spyware removal, indexing, encryption, compaction, decryption, data searching, password management, disk defragmentation, and a host of other tasks.

Initially, as the reconfigurable hardware 400 is received from its manufacturer, key 406 permits the personalization of gatekeeper domain 402. When the service provider has personalized domain 402 to the gatekeeper function, the service provider can then change the setting of key 406 to prohibit further personalization. For example, key 406 may be a one-time-programmable fuse to protect against any further change in the setting of the gatekeeper function.

A second key 408 controls whether task domain 404 can be personalized. The second key can be controlled by the personality in gatekeeper domain 402. Thus, unless the gatekeeper function permits it, only the gatekeeper function can personalize the task domain 404. Other means of providing the personality of the gatekeeper domain are possible by employing the facilities of a secure, trustable client. Such facilities are the subject of the Trusted Computing Group of Portland, Oreg., an industry-standards body.

The function of the gatekeeper domain can be determined in any manner by the service provider in order to safeguard the personality of the task domain. However, the gatekeeper functions preferably includes authentication of a source of personality, verification of that personality is unaltered, decryption of downloaded personality, and transmission of that decrypted personality to the memory switches of the task domain.

In addition, gatekeeper domain may be provided with different levels of access control. Thus, personality originating with a task-specific service cannot destroy or alter personality needed by the personalization service, including that personality that maintains credentials establishing the reconfigurable hardware as authentic. The different levels of access also can protect a personality loaded in the task domain from being altered by unauthorized users.

FIG. 5 is a flowchart showing a sequence of steps for the hardware personalization service provider and the end user to take to personalize both the gatekeeper domain (item 402 of FIG. 4) and the task domain (item 404 of FIG. 4) of the reconfigurable hardware. First, reconfigurable hardware is delivered to the service provider (step 500). The service provider then supplies gatekeeper personalization to the secure domain of the reconfigurable hardware (step 502). The service provider prevents the alteration of the gatekeeper function by changing the setting of key 406 in FIG. 2 (step 504). The partially personalized reconfigurable hardware is then shipped from the service provider to the end user (step 506). The end user installs the plug-in card containing the reconfigurable hardware into a computer (step 508), such as the computer shown in FIG. 3.

After installing the hardware, the client computer establishes a communications link with the service provider over a network such as the network shown in FIG. 1 (step 510). This process is preferably performed by the end user supplying the Universal Resource Locator (URL) of the home page of the service provider to a browser program. The response of the service provider is to display the home page, which provides facilities for the selection among various personalities for the reconfigurable hardware. The user then selects the personality desired (step 512).

The service provider then establishes the personality of the reconfigurable hardware (step 514), a process that will be detailed in FIG. 6. Once that personality has been established, the user may use the functionality it creates for as long as necessary (step 516). When the function is no longer required, the user may then select a new personality (branch 518) by establishing a link to the service provider (step 510).

FIG. 6 is a flow chart showing a process performed by the service provider to establish the task personality in the task domain (item 404 of FIG. 4) of the reconfigurable hardware. The process shown in FIG. 6 is performed during the establish personality step FIG. 5 (step 514). First, the identities of the reconfigurable hardware and of the service provider are established in a secure manner (step 600). The process is known as "authentication." Authentication may be performed by any suitable means, including a private key stored in the gatekeeper domain 402, such as keys 406 and 408 in FIG. 4. The private key may also be functionality provided by the gatekeeper domain 402. This private key can control the encryption of the communication between the gatekeeper and the service provider in order to prevent disclosure of identifiers that establish the authenticity of both the service provider and the reconfigurable hardware. Other means for authentication may be provided, such as passwords, and other security systems.

Once a secure link has been established between the service provider and the gatekeeper domain 402, the gatekeeper allows the desired personality to be downloaded and stored in the task domain (step 602), such as the task domain 404 of FIG. 4. Subsequently, acknowledgement of successful personalization is sent from the gatekeeper domain to the service provider (step 603).

This acknowledgement can be the basis for the assessment of a fee to the user for the service. Thus, the inventions allow a business model for selling reconfigurable hardware personalities. The business model includes selling bundles of personalities with task-specific services as well as unbundled models in which the personality maintenance service subcontracts to task-specific service providers.

The service provider can also provide resolution of personality conflicts caused by different task-specific services and coexistence of solutions based on reconfigurable hardware and on legacy hardware. In addition, the service provider can provide additional domains so that user configurable personalities are available to a user. The service provider can program the domains or the personalities to track a history of use, to self-destruct after a predetermined time or to incorporate an agent that learns through use. Thus, the service provider can provide a complete personality management service.

In addition, the client computer can run software programmed to establish domains in reconfigurable hardware or to download a gatekeeper personality or a task personality from the service provider into the reconfigurable hardware. In this sense, the software acts as a separate gatekeeper personality run in a normal computer-readable medium. The software may be further programmed to load the task personality into the reconfigurable hardware or otherwise control the task personality. The software may be further programmed to activate a fuse operably attached to one or more domains. When activated, the fuse prevents further configuration of one or more domains or one or more personalities contained within the domains.

However, if software is used to configure the domains, then some method of securing the software is also necessary. One method of securing the software is to run the software on a secure platform. Other methods of securing the software may also be used.

The inventions described herein provide for a secure method of providing a task personality to reconfigurable hardware. Without such a secure method, ensuring payment for the use of a task personality would be very difficult. In turn, businesses would be discouraged from developing valuable task personalities because of the high costs associated with developing task personalities. In addition, without security, unauthorized users could steal information from reconfigurable hardware or cause irreparable damage to a user's computer or business. As a result, users would not develop or use valuable task personalities. Thus, the present inventions encourage the development of complex task personalities that are better able to serve the needs of users.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:
    reconfigurable hardware, wherein the reconfigurable hardware is associated with a component in a data processing system and wherein the reconfigurable hardware is configured to receive a personality from a source;
    a first domain located within the reconfigurable hardware, wherein the personality is placed into the first domain, and wherein the personality defines a set of functions for the reconfigurable hardware; and
    a second domain located within the reconfigurable hardware, wherein the second domain is separate from the first domain, and wherein the personality in the first domain has the ability to prevent access to the second domain.

2. The apparatus of claim 1, wherein the set of functions includes at least one of virus scanning, indexing, encryption, decryption and file searching.

3. The apparatus of claim 1, wherein the component is selected from one of a hard disk drive, an optical drive, a memory controller, and a hard disk drive controller.

4. Reconfigurable hardware wherein:
the reconfigurable hardware is configured with a gatekeeper domain operably connected to a task domain; and
the gatekeeper domain is configured with a gatekeeper personality and the task domain is configured to contain a task personality, wherein the gatekeeper personality is resident in the gatekeeper domain, said gatekeeper personality having the ability to prevent access to the task domain.

5. The reconfigurable hardware of claim 4, wherein the gatekeeper personality is configured with at least two levels of access control such that a new personality transferred to the reconfigurable hardware cannot modify the personality of the gatekeeper domain.

6. The reconfigurable hardware of claim 4, wherein the gatekeeper personality is configured with at least two levels of access control such that the gatekeeper personality allows a user to modify at least one aspect of the task domain.

7. The reconfigurable hardware of claim 4, further comprising a task personality resident in the task domain, said task personality configured to perform a task.

8. The reconfigurable hardware of claim 4, further comprising a gatekeeper personality resident in the gatekeeper domain, said gatekeeper personality having the ability to prevent access to the task personality.

9. The reconfigurable hardware of claim 7, wherein the task personality is configured to perform a task selected from the group consisting of anti-virus scanning, virus removal, virus quarantine, adware removal, spyware removal, disk indexing, file indexing, file encryption, file decryption, file compaction, file search, string search, password management and disk defragmentation.

10. The reconfigurable hardware of claim 4, wherein the reconfigurable hardware is provided in the form of one selected from a hard disk controller, a memory controller, an input/output controller, a video controller and an audio controller.

11. The reconfigurable hardware of claim 4, further comprising a first key operably connected to the gatekeeper domain, wherein the first key is configured to control whether a gatekeeper personality, resident in the gatekeeper domain, can be modified.

12. The reconfigurable hardware of claim 4, further comprising a second key operably connected to the gatekeeper domain and the task domain, wherein the second key is configured to grant a gatekeeper personality, resident in the gatekeeper domain, exclusive control over access to the task domain.

13. The reconfigurable hardware of claim 11, further comprising a second key operably connected to the gatekeeper domain and the task domain, wherein the second key is configured to grant the gatekeeper personality exclusive control over access to the task domain.

14. A method in a data processing system for managing functions, the method comprising:
receiving a personality from a source and into a first domain in reconfigurable hardware associated with a component in the data processing system; and
activating the personality in the first domain, wherein the personality configures the reconfigurable hardware to have the ability to prevent access to a second domain in the reconfigurable hardware, and wherein the second domain is separate from the first domain.

15. A method of securing a task personality in reconfigurable hardware, said method comprising the steps of:
establishing a gatekeeper domain and a task domain within the reconfigurable hardware;
loading a gatekeeper personality within the gatekeeper domain, said gatekeeper personality having the ability to prevent access to the task domain;
thereafter loading a task personality within the task domain;
wherein the gatekeeper personality controls the step of loading a task personality within the task domain.

16. The method of claim 15, wherein the gatekeeper personality is further configured to prevent the task personality from being loaded in the task domain without permission from the gatekeeper personality.

17. The method of claim 15, further comprising the step of providing a gatekeeper key operably connected to the gatekeeper domain, wherein said gatekeeper key is configured to control whether the gatekeeper personality can be loaded within the gatekeeper domain.

18. The method of claim 15, further comprising the step of providing a task key operably connected to the gatekeeper domain and to the task domain, said task key configured to control whether the task personality can be loaded within the task domain.

19. The method of claim 18, wherein the task key is further configured such that only the gatekeeper domain controls the task key, whereby only the gatekeeper personality can allow the task personality to be loaded within the task domain.

20. The method of claim 15, further comprising the step of establishing a third domain within the reconfigurable hardware, said third domain configured to contain a personality selected from the group consisting of a second gatekeeper personality and a second task personality.

21. The method of claim 20, wherein the selected personality in the third domain is a second gatekeeper personality and wherein the second gatekeeper personality has the ability to prevent access to a domain selected from the group consisting of the gatekeeper domain, the task domain or a combination thereof.

22. The method of claim 20, wherein the selected personality in the third domain is a second task personality and wherein the gatekeeper personality has the ability to prevent access to the third domain.

23. A method of providing reconfigurable hardware with a first task personality to a user, said method comprising the steps of:
providing the reconfigurable hardware to a service provider, said service provider also providing a server;
establishing a gatekeeper domain and a task domain within the reconfigurable hardware;
providing the reconfigurable hardware with a gatekeeper key, said gatekeeper key having the ability to prevent access to the gatekeeper domain;
thereafter transporting the reconfigurable hardware to a user and installing the reconfigurable hardware into a computer system suitable for operating the reconfigurable hardware, said computer system configured to connect to the server;
connecting the computer system to the server;
authenticating the gatekeeper key;
downloading a gatekeeper personality from the server to the gatekeeper domain of the reconfigurable hardware; and
downloading the first task personality from the server to the task domain of the reconfigurable hardware, wherein the step of downloading the first task personality is controlled by the gatekeeper personality.

24. The method of claim 23, wherein access to the task personality may be prevented by the gatekeeper personality.

25. The method of claim 23, further comprising the step of downloading a second task personality and replacing the first task personality with the second task personality, wherein the step of downloading and replacing the first task personality is controlled by the gatekeeper personality.

26. The method of claim 23, comprising the further step of having the service provider manage the task personality.

27. The method of claim 23, comprising the further step of having the service provider manage the gatekeeper personality.

28. A computer program product in a recordable-type computer readable medium, said program for configuring reconfigurable hardware operably connected to a data processing system, said computer program product comprising:

first instructions for establishing a first domain and a second domain within the reconfigurable hardware, wherein the first domain is separate from the second domain;

second instructions for operably connecting the first and second domains to each other;

third instructions for downloading a first personality into the first domain; and fourth instructions for downloading a second personality into the second domain, wherein the first personality has the ability to prevent access to one of the first domain, the second domain, the first personality, the second personality and combinations thereof.

* * * * *